US007874053B2

(12) United States Patent
Stangel

(10) Patent No.: US 7,874,053 B2
(45) Date of Patent: Jan. 25, 2011

(54) DOOR CONVERTER ASSEMBLY FOR STORAGE CONTAINERS

(76) Inventor: John Stangel, 1801 Macy Dr., Roswell, GA (US) 30076

( * ) Notice: Subject to any disclaimer, the term of this patent is extended or adjusted under 35 U.S.C. 154(b) by 980 days.

(21) Appl. No.: 11/613,828

(22) Filed: Dec. 20, 2006

(65) Prior Publication Data

US 2007/0289888 A1 Dec. 20, 2007

Related U.S. Application Data

(60) Provisional application No. 60/815,116, filed on Jun. 20, 2006.

(51) Int. Cl.
*B21K 21/16* (2006.01)
*B23P 17/04* (2006.01)
*B23P 23/00* (2006.01)

(52) U.S. Cl. .................. 29/401.1; 29/897.1; 29/402.09; 220/561; 220/1.5

(58) Field of Classification Search ................ 29/401.1, 29/897.1, 897.2, 402.01, 402.09, 426.1; 220/1.5, 220/561; 414/11
See application file for complete search history.

(56) References Cited

U.S. PATENT DOCUMENTS 2,528,818 A 3/1947 Brown et al.
3,361,280 A * 1/1968 Traver ........................ 414/627
3,516,366 A * 6/1970 Bradford et al. ............ 105/378
3,892,385 A * 7/1975 Andrist et al. .......... 254/133 R
5,127,791 A * 7/1992 Attman ....................... 414/814
5,265,748 A * 11/1993 Furukawa ................... 220/1.5
6,279,767 B1 * 8/2001 Yoon .......................... 220/1.5
6,609,284 B2 * 8/2003 Sheridan et al. ............ 29/401.1
7,175,168 B2 * 2/2007 Hardaker et al. .............. 269/17
2006/0043090 A1 * 3/2006 Ferrini .......................... 220/6
2007/0000921 A1 * 1/2007 Butler et al. ................. 220/1.5

* cited by examiner

*Primary Examiner*—David P Bryant
*Assistant Examiner*—Christopher M Koehler
(74) *Attorney, Agent, or Firm*—Baker Donelson Bearman Caldwell & Berkowitz, PC

(57) ABSTRACT

An assembly of a frame and doors with a lifting device to position the assembly in an open end of a storage container for conversion to access from opposing ends, the frame including side plates and end plates that abut respective side walls and end edges of end of the storage container from which an end panel is removed, and the lifting device attached to the assembly to hold the assembly in the end while rigidly connecting the assembly to the storage container. A method of converting a storage container for dual opposing access is disclosed.

6 Claims, 8 Drawing Sheets

DOOR CONVERTER ASSEMBLY FOR STORAGE CONTAINERS

This application claims priority to US Provisional Application filed Jun. 20, 2006 as Ser. No. 60/815,116, incorporated in its entity herein by reference.

TECHNICAL FIELD

The present invention relates to storage containers. More particularly, the present invention relates to a door converter apparatus and method for converting storage containers to permit dual access into the storage container from opposing ends.

BACKGROUND OF THE INVENTION

International trade involves the transportation of products from one country to another, and typically involves transportation of manufactured products from China to distribution centers in Europe, the United States, and other countries. Shipment of many types of manufactured products is often accomplished with sea-going freighters. These freighters provide relatively inexpensive shipping costs for goods moving from manufacturers to consumers.

To facilitate handling of the products being shipped, manufacturers are provided with a standard-size shipping container. The shipping containers are generally rectangular in cross-section and of a standard size. The shipping containers are made of steel side walls and rectangular steel tubular framing members. Typically, one end of the shipping container is closed with a panel and the opposing end is closed with selectively openable doors for access into the shipping container. The shipping containers are sized for readily attaching to tractor trailer rigs or train cars for travel between the manufacturer and the port for ocean shipment. The freighters are specially configured for receiving, stacking, and securing these standard containers. The manufacturers fill the shipping containers with the particular products, and have the containers delivered to the port for shipment. Cranes load the storage containers in the hold of the freighter.

Upon arrival of the freighter at the destination port, the shipping containers are removed from the freighter and placed on tractor trailer rigs, trains or other ground transportation, for moving from the port to warehouses or other storage facilities for the owners of the container. After the contents of the storage container are unloaded, the shipping container is readily reused for return shipment of raw materials or other products.

However, many storage containers are not returned for reuse, but rather occupy storage areas. The storage containers are held for return, for reuse, and for moving products by tractor trailer truck or by rail. Recently, use has been made of the storage containers for temporary storage of products.

While these storage containers have provided temporary storage location for inventory, raw materials, and other products, there are drawbacks to their use. As noted above, typically, the storage containers have the single set of doors at one end of the storage container. For use as an interim storage location however, access into the container from opposing ends provides important benefits for persons and companies using these devices for short term, temporary or other types of storage. Heretofore, however, there has not been a suitable way to retrofit storage containers for new use as a dual access storage container. Accordingly, it is to such that the present invention is directed.

SUMMARY OF THE INVENTION

The present invention meets the need in the art by providing a retrofit after-market door converter assembly with a lifting device for holding and positioning the door converter assembly in an end of the storage container from which an end panel has been removed, according to a method for converting storage containers with the door converter apparatus to permit dual access into the storage container from opposing ends.

In one aspect, the present invention provides a door converter apparatus for installing in an end of a storage container from which an end panel has been removed, comprising a mounting frame having two opposing vertical members and two opposing horizontal members, each member having an end plate and a side plate, a pair of doors, each hingedly attached to a respective one of the vertical members; and a structure that selectively locks the doors in a plane defined by the mounting frame for shipment and installation of the door converter apparatus in an open end of a storage container, wherein the end plates of the mounting frame bear against a distal edge of the open end of the storage container and the side plates abut against an inside surface of the open end of the storage container, and being fixably secured, provide a selectively operable door for the storage container.

In another aspect, the present invention provides a method of converting a box storage container having a end closed by a panel and an opposing end having selectably openable doors for selective entry from opposing ends, comprising the steps of (a) removing an end panel of a closed end of a box storage container to define an open end thereof having free distal edges;

(b) providing a door converter apparatus having a frame that defines end plates and side plates with at least one hingedly attached door;

(c) positioning the door converter apparatus within the open end of the box storage container with the end plates contacting against the free distal edges of the open end and the side plates adjacent respective walls of the box storage container; and (d) fastening the end plates to the free edges and the side plates to the walls, wherein the door converter assembly, fasten to the end of the box storage container from which the panel was removed, provides a selectively openable and closeable door for the opposing end of the box storage container.

In another aspect, the present invention provides a lifting frame for picking up and holding a door converter apparatus in an end of a box storage container from which an end panel has been removed during box storage conversion to provide selectively openable doors from opposing ends of the box storage container, comprising: a support frame having two opposing side members, a bottom member and an opposing top member rigidly joined together; a pair of intermediate members attached transverse to the two opposing side members; a pair of U-shaped forklift pockets attached to a first one of the transverse members; a second pair of forklift pockets attached to and extending from the top member; two pairs of connectors, each pair of connectors attached to a respective one of the transverse members for selectively moving from a first position for engaging a portion of the door converter assembly and a second position for securing the door converter assembly to the lifting device; and two opposing legs pivotally attached to the side members and moveable from a folded position and an erect position extending outwardly from the side member, wherein the lifting assembly, being connected to the door converter assembly by the moveable hooks, holds the door converter assembly in an open end of a box storage container for installation or with the pivotable legs moved to the extended position supporting the door converter assembly in a standing position for installation in an open end of a box storage container.

Objects, features, and advantages of the present invention will become readily apparent upon reading of the following detailed description in conjunction with the drawings and the appended claims.

DETAILED DESCRIPTION

Figure 1A:
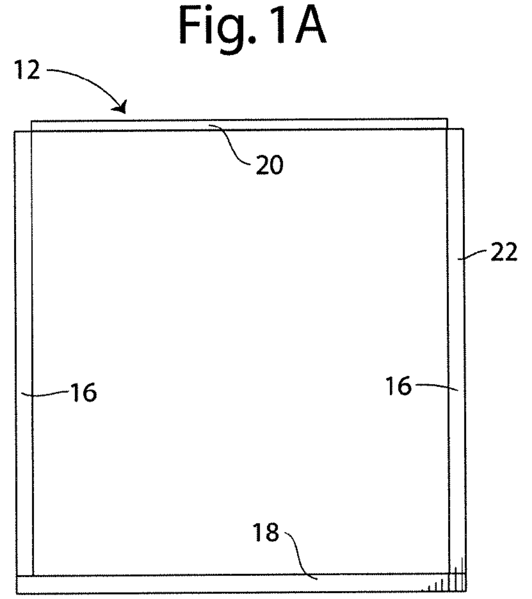
FIGS. 1A-1D illustrate a door converter assembly for storage containers according to the present invention, showing in plan view a frame (FIG. 1A), a door set assembly (FIG. 1B), and a pair of doors (FIG. 1C), with a sectional view (FIG. 1D).
Figure 1B:
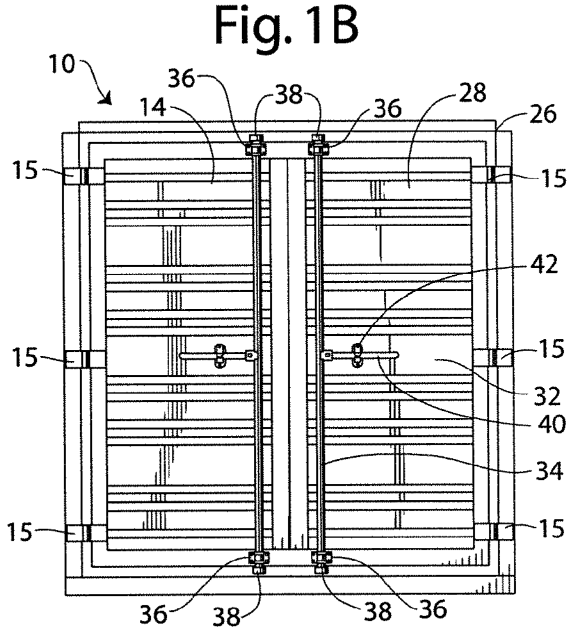
Figure 1C:
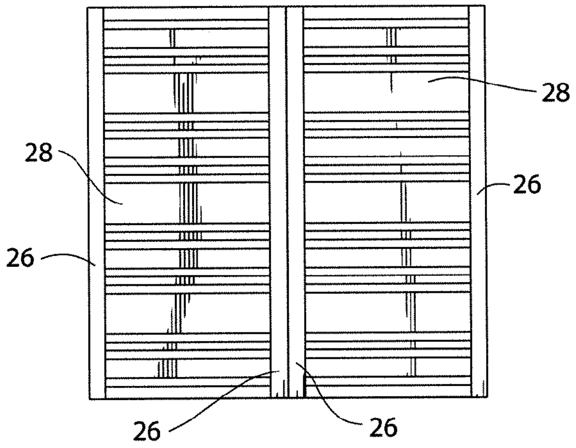
Figure 1D:
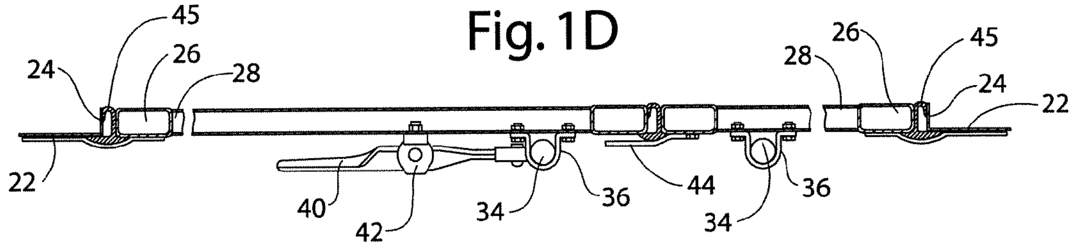

With reference to the drawings in which like reference numerals indicate like parts, FIGS. 1A-1D illustrate a converter assembly 10 having a frame 12 (FIG. 1A), a door converter assembly 10 (FIG. 1B), and a pair of doors 14 (FIG. 1C), with a sectional view FIG. 1D. FIGS. 1A-1D illustrate the door converter assembly 10 in accordance with the present invention for converting a storage container having a first end closed by a panel and an opposing end with selectively openable doors to a dual-access container thorough selectively openable doors on the opposing ends. The door converter assembly 10 includes the frame generally 12 and at least one door generally 14 mounted in the frame 12. The illustrated embodiment has two opposing doors attached by hinges 15 to the frame 12 as discussed below.

With reference to FIG. 1A, the frame 12 includes two spaced-apart side members 16, a sill member 18, and a header member 20. The members 16, 18 and 20 are angle members or similar structures that each define at least an end plate 22 and a side plate 24. The members 16, 18 and 20 are rigidly joined at respective distal ends to form the frame 12.

With reference to FIG. 1C, the doors 14 in the illustrated embodiment are conventional steel panel doors of a type commonly used in sea-going box storage containers. The doors 14 include a frame 26 and a panel 28 held by the frame.

As shown in FIG. 1B, hinges 15 attach the doors 14 to the respective side member 16 for positioning in a closed position in a plane defined by the frame 12 or in an open position pivoted on the hinges outwardly of the frame. The doors for storage containers include an exterior door handle and locking device generally 32. The handle and lock device 32 includes an elongate cylindrical member 34 held by spaced-apart loops 36 attached to the panel 28. The opposing distal ends of the cylindrical tube 34 define extended fingers. A pair of stubs 38 mount to the sill member 18 and the header member 20 in alignment with the cylindrical tube 34 for selective engagement by the fingers upon rotation of the tube. A handle 40 pivotally attaches to the tube 34. The handle 40 moves from a first position engaged in a latch 42 to a second position for rotation of the tube 34. Rotating the tube 34 causes the finger to engage or disengage from the stubs 38. With the fingers engaged to the stub, the doors 14 are locked; the tube 34 is rotated to release the fingers from the stubs 38 in order to swing the doors 14 open on the hinges 15. An anti-racking bracket generally 44 (see FIG. 1D) locks opposing doors 14 together for shipping and handling until installed. A door gasket 45 seals between the edge of the door 14 and the frame 12.

Figure 2:
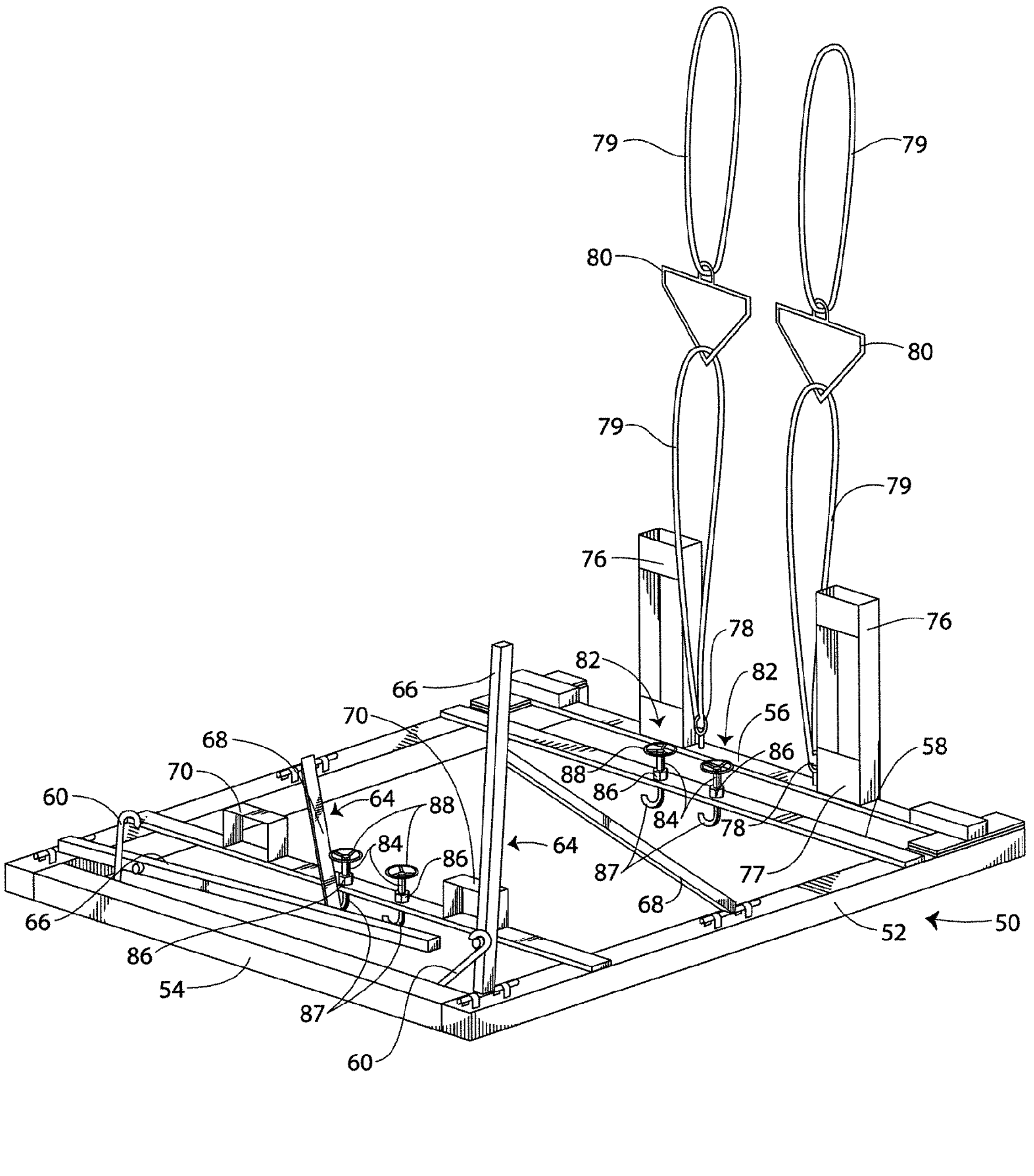
FIG. 2 is a perspective view of a lifting device for installing the door converter assembly illustrated in FIGS. 1A-1D into an open end of a storage container according to the present invention.

FIG. 2 illustrates in perspective view a lifting device 50 configured for holding the door converter assembly 10 for installation in an open end of a storage container, as discussed below. The lifting device 50 includes opposing side members 52, a lower transverse member 54 and an opposing upper transverse member 56. A pair of intermediate transverse members 58 connect between the side members 52. A pair of leg hooks 60 attach at a first end to the lower transverse member 54. A distal free end of the leg hook 60 defines a hook for engaging one of a pair of stand legs generally 64. One of the stand legs 64 is illustrated in the collapsed position and the other stand leg 64 is illustrated in the extended positions. The stand leg 64 includes a leg member 66 and a diagonal arm 68. The stand legs 64 pivotally attach to a respective side member 52. The stand legs 64 pivot from a first collapsed position aligned with the lower transverse member 54 and a second extended position.

Two forklift pockets 70 attach to the lower transverse member 54. The forklift pockets are U-shaped members that rigidly connect to and extend laterally from the lower intermediate transverse member 58. The forklift pockets 70 each define an opening through which the forks of a forklift truck may extend generally parallel to a plane defined by the side members 52.

A pair of upper lift pockets 76 attach to the upper transverse member 56. The upper lift pockets 76 are elongated tubes that extend laterally from a side of the upper transverse member 56. One end 77 of the tubes includes lateral flanges 79 with openings that align with openings in the upper transverse member 56. The aligned openings receive bolts (not illustrated) for connecting the tubes to the upper transverse member 56. The upper lift pockets 76 are open-ended and sized for receiving forks of a forklift truck, as discussed below.

A pair of lift rings 78 attach to the upper transverse member 56. A flexible elongated lifting member 79, such as a wire cord or chain, attaches to the lift ring 78. In the illustrated embodiment, the lifting member 79 includes an intermediate fork guide 80. The intermediate fork guide 80 is triangular, with one side that bears on an upper surface of a fork while the other sides extend along side the sides of the fork as discussed below.

The lifting device 50 includes a clamp or engaging device to attach the lifting device to the door converter assembly 10. In the illustrated embodiment, the intermediate transverse members 58 each include a pair of clamps generally 82. The clamp 82 includes a threaded shaft 84 that extends through a threaded connector 86. The shaft 82 extends through the intermediate transverse member 58 and terminates at a distal end in a J-bend or hook 87. The diameter or curved and defined by the hook 87 is suitable for receiving the cylindrical tube 34 of the door converter assembly 10. A wheel 88 attaches to the threaded shaft 84. Rotation of the wheel 88 causes the threaded shaft 84 to rotate and move the hook 87 relative to the intermediate transverse member 58. Rotating the turn wheel 88 in a first direction moves the hook 87 away from the intermediate transverse member 58; turning the wheel in the opposite direction draws the hook closer.

Figure 8:
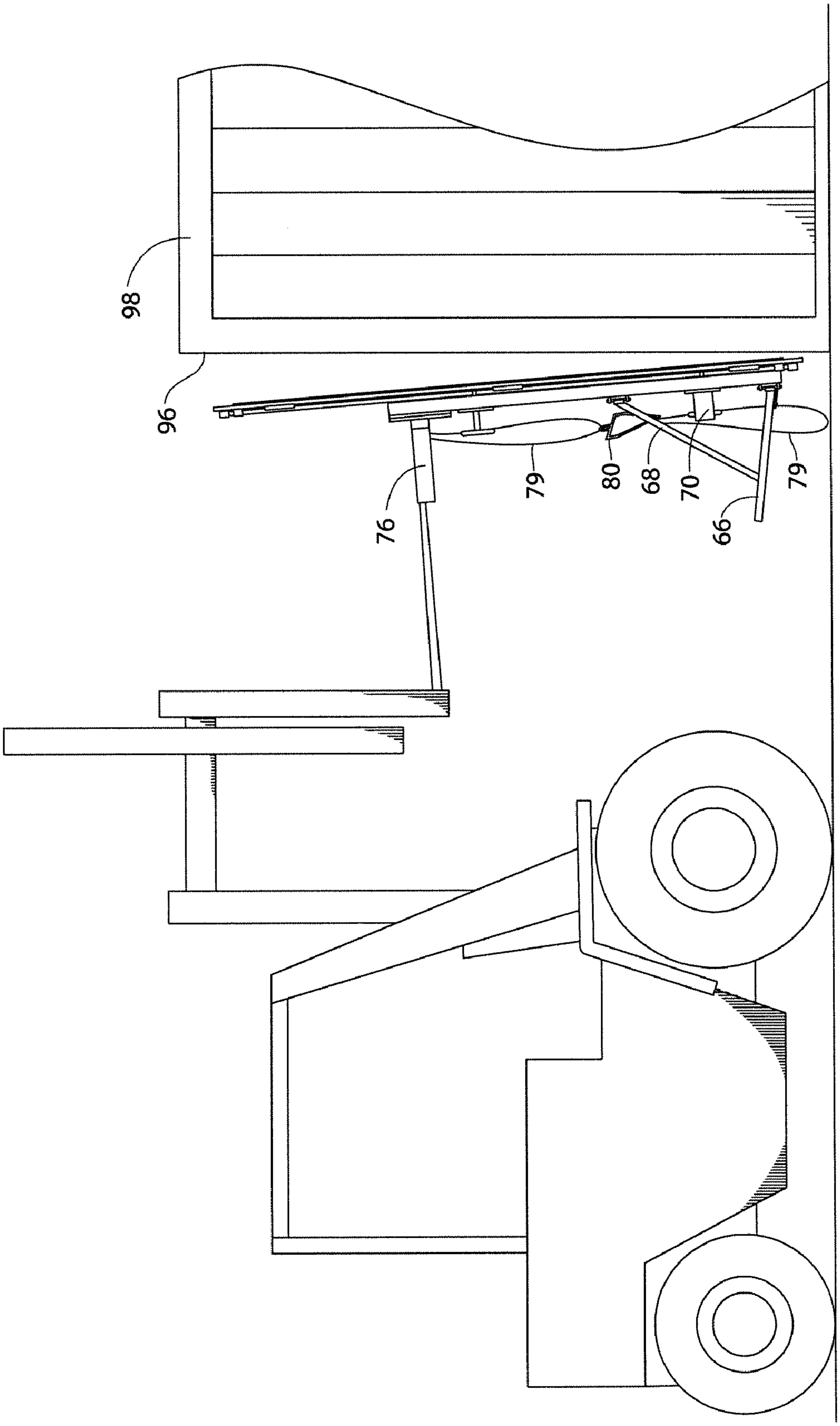
FIG. 8 illustrates the door converter assembly supported on the forks of the forklift truck and positioned near an open end of a storage container for installation.

With reference to FIG. 8, the door converter assembly 10 of the present invention closes an end 96 of a storage container 98 that has been opened by removing an end panel 99. The door converter assembly 10 installs during a conversion of the storage container 98 from a single-access end to dual-access ends with doors in opposing ends. The door converter assemblies 10 are shipped in a stack of assemblies to a storage location for conversion of storage containers. The lifting device 50 is used for picking up the door converter assembly 10 from the stack, pivoting the door converter assembly to an upright position, and lifting the door converter assembly for holding in the end 96 of the storage container 98 being converted to dual access.

Figure 3:
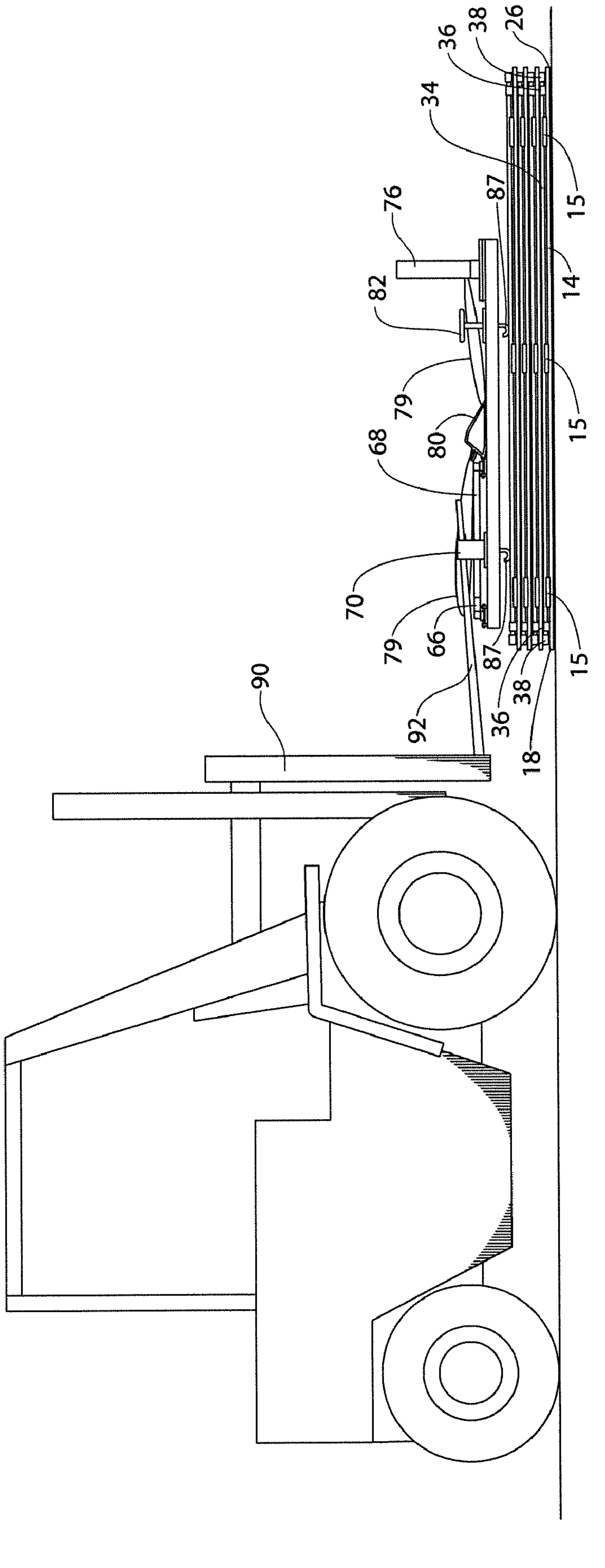
FIG. 3 illustrates the lifting device carried by a forklift truck for picking up one of the door converter assemblies illustrated in FIGS. 1A-1D from a stack of such assemblies in order to position the assembly in an open end of the storage container.
Figure 4:
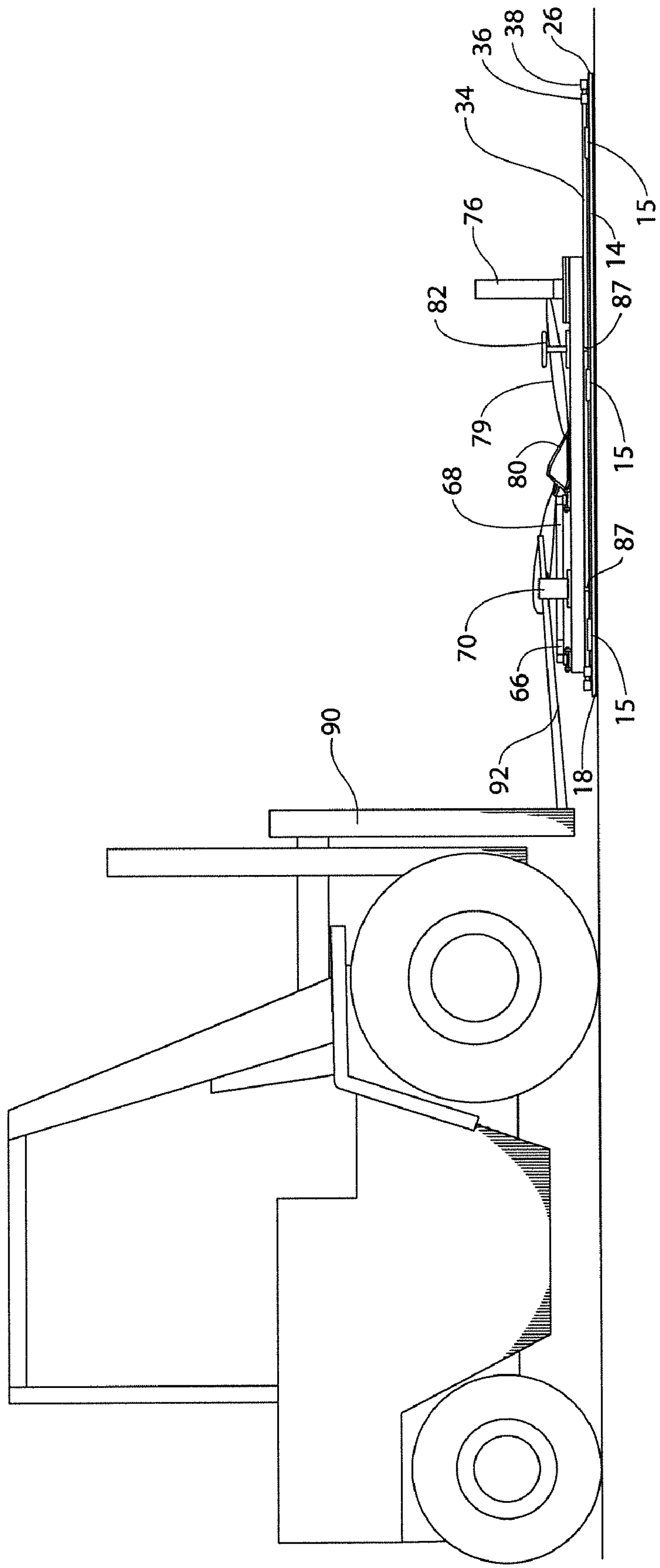
FIG. 4 illustrates the door converter assembly attached to the lifting device carried by the forklift truck.

The storage container 98 is prepared for conversion by removing the panel 99 at the closed end. This is accomplished by cutting out the steel panel on the end of the storage container inwardly of the tubular frame members. The cutting is accomplished using suitable metal cutting equipment, including a cutting torch or a plasma cutter. Once the closed end is opened, the door converter assembly 10 is installed. FIGS. 3-8 illustrate the process of picking up the door converter assembly 10, pivoting the door assembly to an erect position and positioning the door converter assembly in the open end of a container. As shown in FIG. 3, the upper lifting pockets 76 attach to the upper transverse member 58. A conventional forklift truck 90 having forks 92 is operated to insert the forks 92 into the loops 70 of the lifting device 50. The lifting device 50 is positioned on the uppermost door converter assembly 10 in the stack. The lifting device 50 clamps to the door converter assembly 10. This is accomplished by positioning the hooks 87 at the distal ends of the clamps 82 under the tubular members 34. Each of the wheels 88 is rotated, to move the threaded bolt 84 in the connector 86 and thereby bring the hook 87 into engaging contact with the respective tubular member 34. The forklift truck 90 operates to lift the door converter assembly 10 off of a stack and then place the selected door converter assembly 10 on the ground as shown in FIG. 4. The forklift 90 removes the forks from the loops 70.

Figure 5:
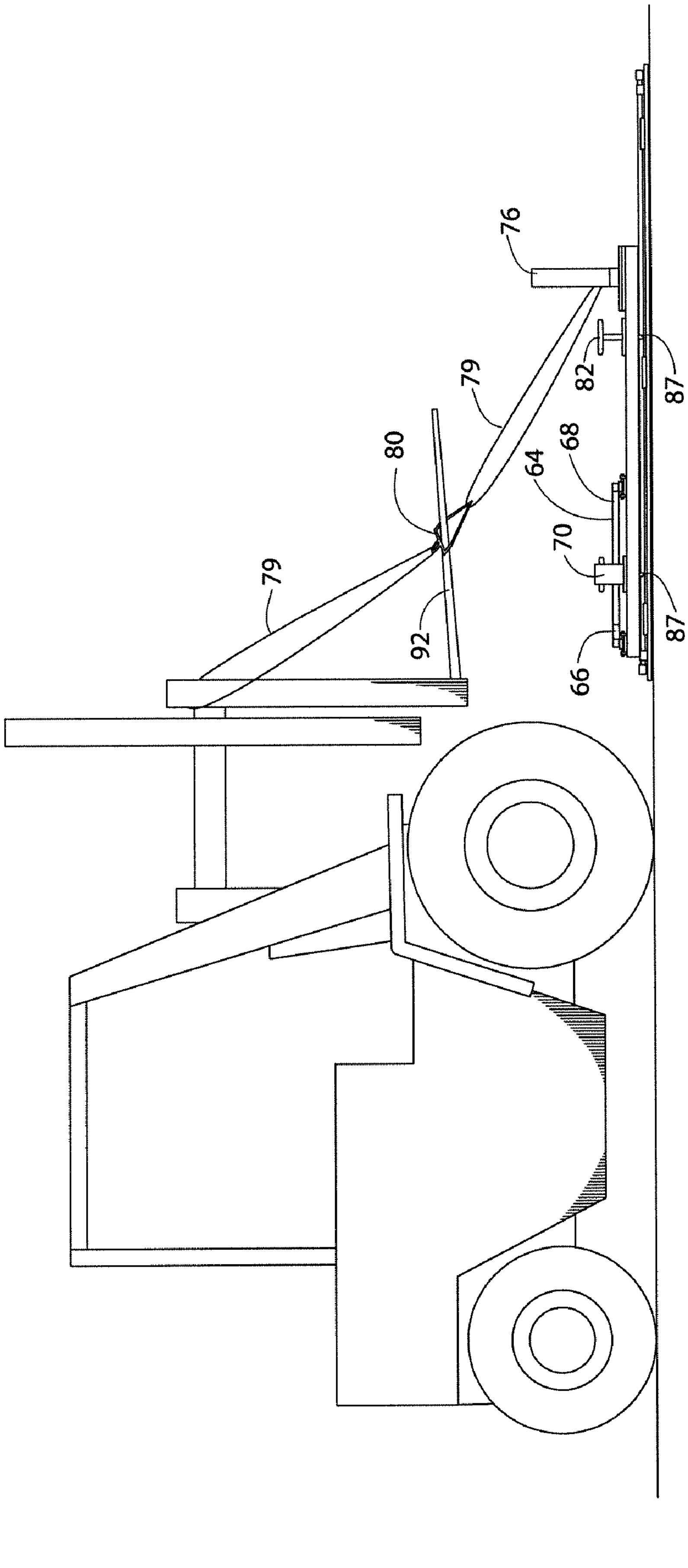
FIG. 5 illustrates the door converter assembly attached with cables to the forklift truck for lifting to an erected position.
Figure 6:
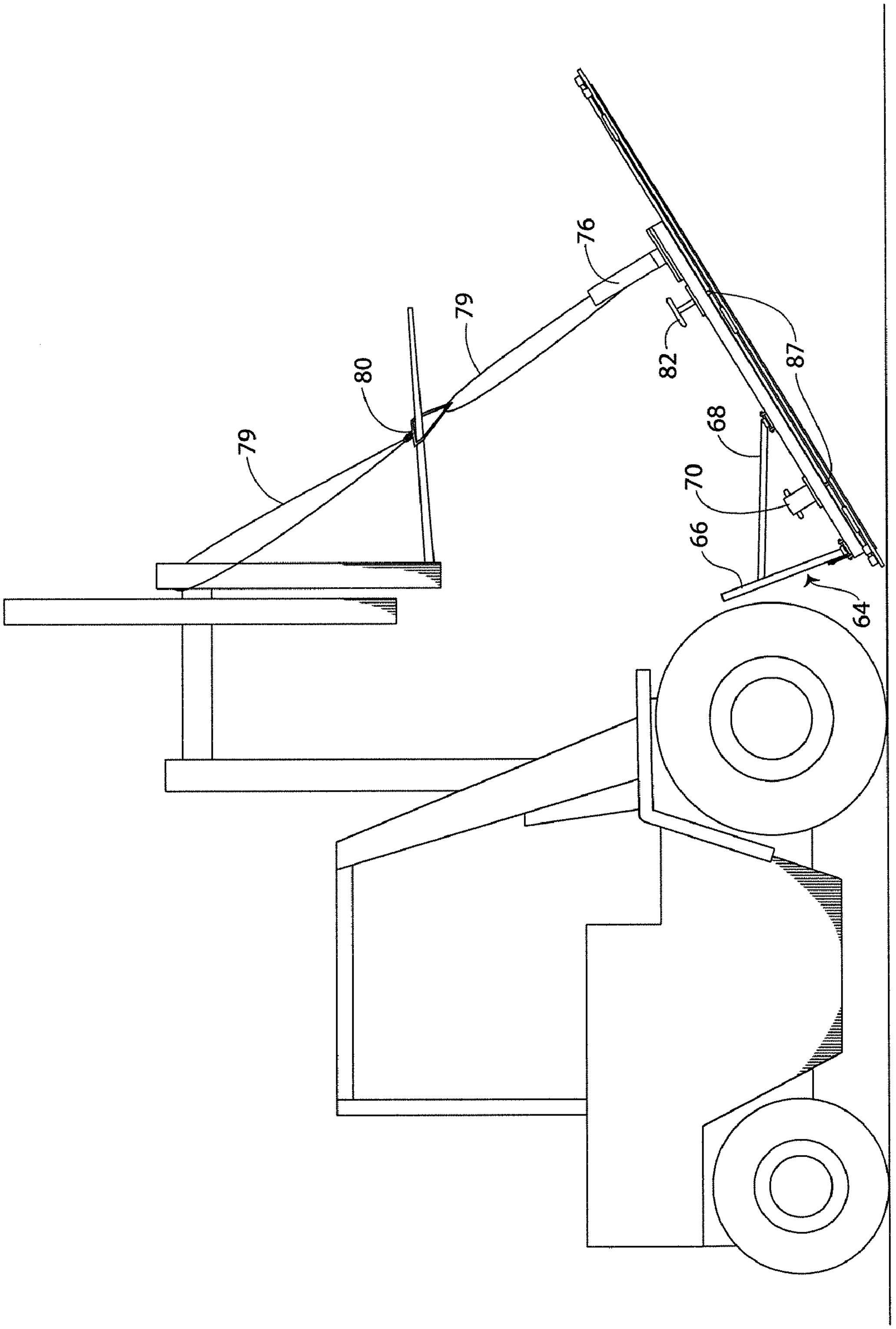
FIG. 6 illustrates the door converter assembly being raised by the forklift truck prior to installation in the storage container.

With reference to FIG. 5, the respective free ends of both of the lifting members 79 attach to the forklift 90. The intermediate fork guides 80 slide onto the extending forks 92. The forklift 90 is positioned with its front wheels bearing against an edge of the lifting device 50. The stand legs 64 pivot from the collapsed or folded position to the extended lateral position (see FIG. 6). The leg hooks 60 pivot from the lower transverse member 54 and connect to the respective stand leg 64 to lock the stand leg in the extended position. The forks of the forklift 90 are elevated. The lifting members 79 cause the opposing end of the clamped lifting device 50 and the door converter assembly 10 to rise, pivoting about the end against the front wheels of the forklift 90. The intermediate fork guide 80 slides longitudinally on the forks 92 as the clamped device 50 and assembly 10 pivot upwardly, as illustrated in FIG. 6. The stand legs 64 pivoted to the extended position allow the clamped lifting device 50 and the door converter assembly 10 to stand as shown in FIG. 7.

Figure 7:
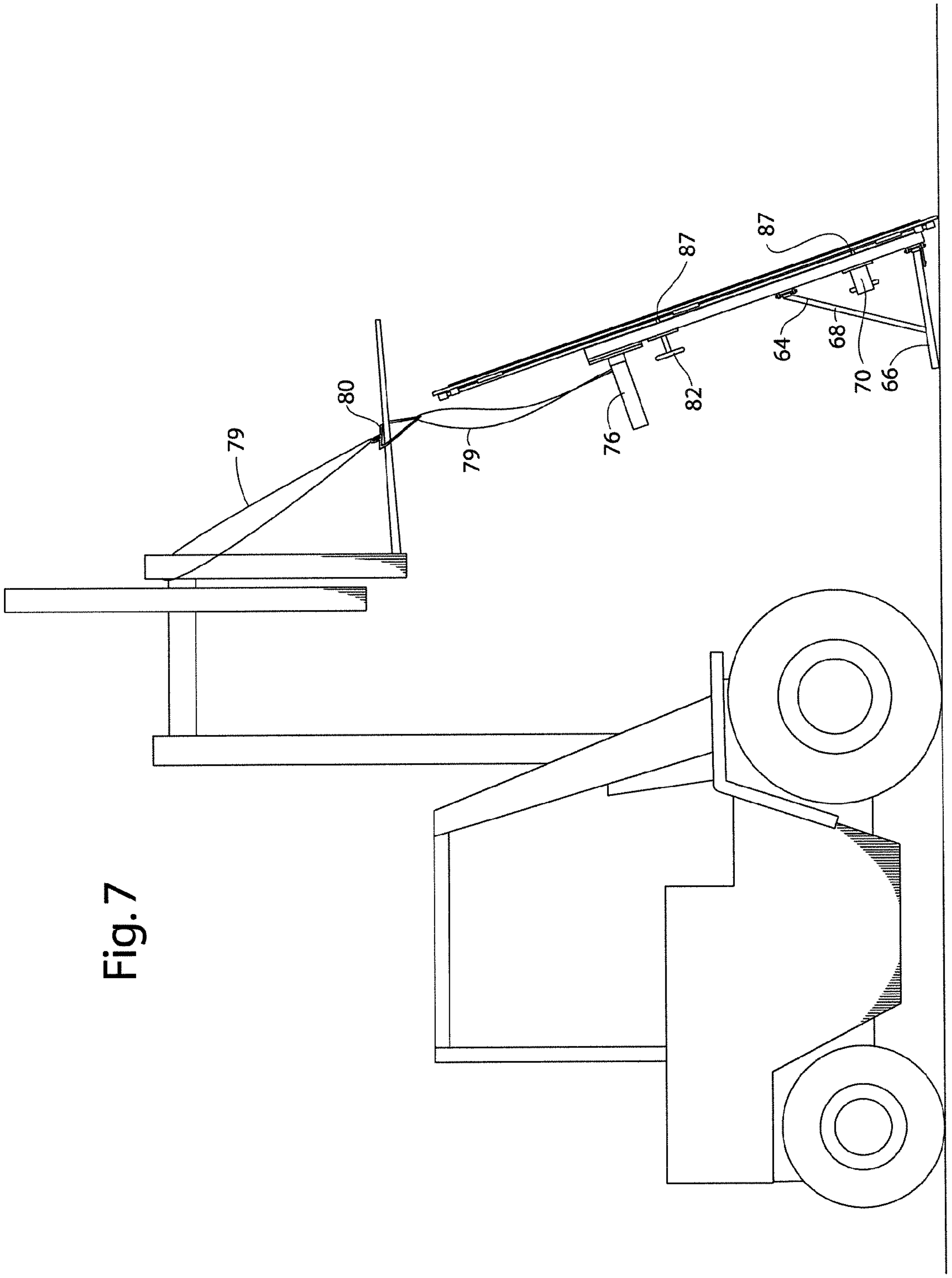
FIG. 7 illustrates the door converter assembly standing in an erected position prior to repositioning the forks of the forklift truck for picking up the door converter assembly in order to install the door converter assembly in an open end of the storage container.

With continuing reference to FIG. 7, the clamped device 50 and assembly 10 pivot to an erected position supported by the stand legs 64. The forklift 90 lowers, and moves to insert the forks 92 into the upper lift pockets 76. The forklift 90 then lifts the clamped device 50 and assembly 10. With reference to FIG. 8, the forklift 90 moves forwardly to orient the lifted clamp device 50 and assembly 10 relative to the open end 96 of the storage container 98. The forklift 90 then positions the supported clamped device 50 and assembly 10 in the open end of the storage container. The side plates 24 of the frame 12 slide longitudinally beside the respective side wall, bottom, and top of the open end of the storage container. The end plates 22 contact the respective edges of the open end of the storage container. With the forklift 90 stationary, the door converter assembly 10 is rigidly connected to the end of the storage container by welding the side walls, the bottom, and the top to the respective side and end plates of the frame members. The clamps 82 are released, by rotating the wheels 88 in the opposing direction to move the hooks 87 away from engaging contact with the tubes 34. The forklift 90 is moved away from the rigidly connected door assembly on the storage container. The doors 14 are operated conventionally using the door handle and locking device 32 for access into the storage container from the formerly closed end.

The foregoing specification describes above the present invention of the door converter assembly for converting box storage containers having one end closed by the panel and the opposing end with selectively openable doors to dual-access with selectively openable doors in opposing ends and the lifting device to hold the door converter assembly during the conversion process, including the steps necessary for making and using various embodiments thereof, and for converting box storage containers for dual access. It is to be understood, however, that numerous changes and variations may be made in the construction of the converter within the spirit and scope of the present invention and that modifications and changes may be made therein without departing from the scope thereof as set forth in the appended claims.

What is claimed is:

1. A method of installing a door converter assembly in an end of a box storage container from which an end panel has been removed opposing a second end having a selectively openable door to provide dual access from opposing ends to the box storage container, comprising the steps of:

(a) providing a door converter assembly comprising:

a mounting frame;

at least one door hingedly attached to the mounting frame; and means for selectively locking the door in a plane defined by the mounting frame for shipment and installation of the door converter assembly in an end of a box storage container from which an end panel has been removed;

(b) attaching a lifting frame to the door converter assembly, the lifting frame comprising:

a support frame having at least a first pair forklift pockets attached in spaced apart relation to the support frame; and a plurality of first connectors attached in spaced-apart relation to the support frame, each of the first connectors selectively moveable from a first position for engaging a portion of the door converter assembly and a second position securing the door converter assembly to the lifting frame;

(c) standing the lifting frame with the attached door converter assembly in an erected position;

(d) raising the lifting frame and the attached door converter assembly and inserting the door converter assembly into an open end of a box storage container;

(e) rigidly connecting the mounting frame of the door converter assembly to the box storage container; and (f) detaching the lifting frame from the door converter assembly, whereby the door converter assembly with the mounting frame being rigidly connected to the box storage container, provides a selectively operable door in the end of the storage container from which the end panel was removed.

2. The method as recited in claim 1, further comprising the step of positioning legs to extend outwardly from the lifting frame to hold the lifting frame with the attached door converter assembly in the erected position.

3. The method as recited in claim 1, wherein the lifting frame further comprises a pair of legs that move from a first position to a second position extending outwardly from the lifting frame.

4. The method as recited in claim 1, wherein the lifting frame further comprises two opposing legs pivotally attached to the support frame and moveable from a folded position and an erect position extending outwardly therefrom.

5. The method as recited in claim 1, wherein the step (c) standing door converter assembly attached to the lifting frame comprises:

attaching second connectors from a pair of forks of a forklift truck to the support frame; and raising the forks to pivot the lifting frame and attached door converter assembly from a connecting position to the erected position.

6. The method as recited in claim 1, wherein the step (d) comprises inserting the forks of the forklift truck into the forklift pockets and raising the forks and moving the forklift towards the open end of the box storage container.

* * * * *